United States Patent
Wu et al.

(10) Patent No.: US 10,034,323 B2
(45) Date of Patent: Jul. 24, 2018

(54) CONTROL METHOD FOR BLE COMMUNICATION BETWEEN HOST DEVICE AND PERIPHERAL DEVICE

(71) Applicant: HTC Corporation, Taoyuan (TW)

(72) Inventors: Jing-Lung Wu, Taoyuan (TW); Cheng-Yu Chung, Taoyuan (TW); Kai-Hsiu Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/475,110

(22) Filed: Mar. 30, 2017

(65) Prior Publication Data

US 2018/0098368 A1    Apr. 5, 2018

Related U.S. Application Data

(60) Provisional application No. 62/404,227, filed on Oct. 5, 2016.

(51) Int. Cl.

| | |
|---|---|
| H04W 8/00 | (2009.01) |
| H04W 72/12 | (2009.01) |
| H04B 7/185 | (2006.01) |
| H04W 76/14 | (2018.01) |
| H04W 76/02 | (2009.01) |
| H04W 4/00 | (2018.01) |
| H04W 4/80 | (2018.01) |

(52) U.S. Cl.
CPC ........... *H04W 76/14* (2018.02); *H04W 4/008* (2013.01); *H04W 4/80* (2018.02); *H04W 8/005* (2013.01); *H04W 76/023* (2013.01)

(58) Field of Classification Search
CPC ... H04W 76/023; H04W 8/005; H04W 4/008; H04W 72/10; H04W 72/1247; H04B 3/544; H04B 7/18558
See application file for complete search history.

(56) References Cited

U.S. PATENT DOCUMENTS

| | | | | |
|---|---|---|---|---|
| 8,326,225 | B2 * | 12/2012 | Oba | H04M 1/7253 455/41.2 |
| 2009/0323609 | A1 * | 12/2009 | Walton | H04W 48/16 370/329 |
| 2012/0284427 | A1 * | 11/2012 | Dods | H04W 88/00 710/3 |
| 2013/0040574 | A1 * | 2/2013 | Hillyard | H04W 8/005 455/41.2 |
| 2013/0238760 | A1 * | 9/2013 | Jiang | H04W 52/0277 709/219 |

(Continued)

*Primary Examiner* — Andrew Wendell
(74) *Attorney, Agent, or Firm* — CKC & Partners Co., Ltd.

(57) ABSTRACT

A control method, suitable for a host device including a Bluetooth low energy communication circuit, includes following operations. A high priority list is obtained. The high priority list includes information about at least one first peripheral device. The BLE communication circuit is triggered to perform a first scan to search for any peripheral device around the host device. A first search result of the first scan is compared with the high priority list. In response to that the first search result covers all of the at least one first peripheral device in the high priority list, the BLE communication circuit is triggered to stop the first scan. The BLE communication circuit is triggered to communicate with the at least one first peripheral device found in the first scan.

7 Claims, 7 Drawing Sheets

(56) References Cited

U.S. PATENT DOCUMENTS

| | | | |
|---|---|---|---|
| 2015/0127733 A1* | 5/2015 | Ding | H04W 4/08 |
| | | | 709/204 |
| 2015/0245280 A1* | 8/2015 | Zhou | H04W 36/32 |
| | | | 455/434 |
| 2017/0245204 A1* | 8/2017 | Kumar | H04W 48/16 |
| 2017/0290069 A1* | 10/2017 | Weizman | H04W 76/02 |

\* cited by examiner

CONTROL METHOD FOR BLE COMMUNICATION BETWEEN HOST DEVICE AND PERIPHERAL DEVICE

RELATED APPLICATIONS

This application claims priority to U.S. Provisional Application Ser. No. 62/404,227, filed Oct. 5, 2016, which is herein incorporated by reference.

BACKGROUND

Field of Invention

The present application relates to a communication system. More particularly, the present application relates to a control method related to a management of communication process on a Bluetooth-based communication system.

Description of Related Art

Bluetooth low energy (BLE) is a wireless communication solution, which is popular in various applications such as healthcare, fitness, beacon, security, etc. BLE technology is intended to provide commutation capability over wireless connections with reduced power consumption and cost.

In a conventional communication procedure, when a BLE host device tries to reach multiple desired BLE peripheral devices, the BLE host performs a full scan on the whole communication channel at first, and then the BLE will start to connect these peripheral devices. The full scan takes a certain period of time, such that the user must wait for the full scan to be complete and then the BLE connections are established afterward. The user may experience a long delay from the user requests to initiate the BLE connections until the BLE connections are established.

SUMMARY

An embodiment of the disclosure provides a control method, which is suitable for a host device includes a Bluetooth low energy (BLE) communication circuit. The control method includes following operations. A high priority list is obtained. The high priority list includes information about at least one first peripheral device. The BLE communication circuit is triggered to perform a first scan to search for any peripheral device around the host device. A first search result of the first scan is compared with the high priority list. In response to that the first search result covers all of the at least one first peripheral device in the high priority list, the BLE communication circuit is triggered to stop the first scan. The BLE communication circuit is triggered to communicate with the at least one first peripheral device found in the first scan.

Another embodiment of the disclosure also provides a control method. The control method includes following operations. The BLE communication circuit is triggered to perform a first scan to search around the host device. Signal strength between the host device and a peripheral device found in the first scan is compared with a threshold signal strength level. In response to that the signal strength exceeds the threshold signal strength level, the BLE communication circuit is triggered to stop the first scan. The BLE communication circuit is triggered to communicate with the peripheral device found in the first scan.

Another embodiment of the disclosure also provides a control method. The control method includes following operations. A high priority list is obtained. The high priority list includes information about at least one first peripheral device. The BLE communication circuit is triggered to communicate with the at least one first peripheral device in the high priority list.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
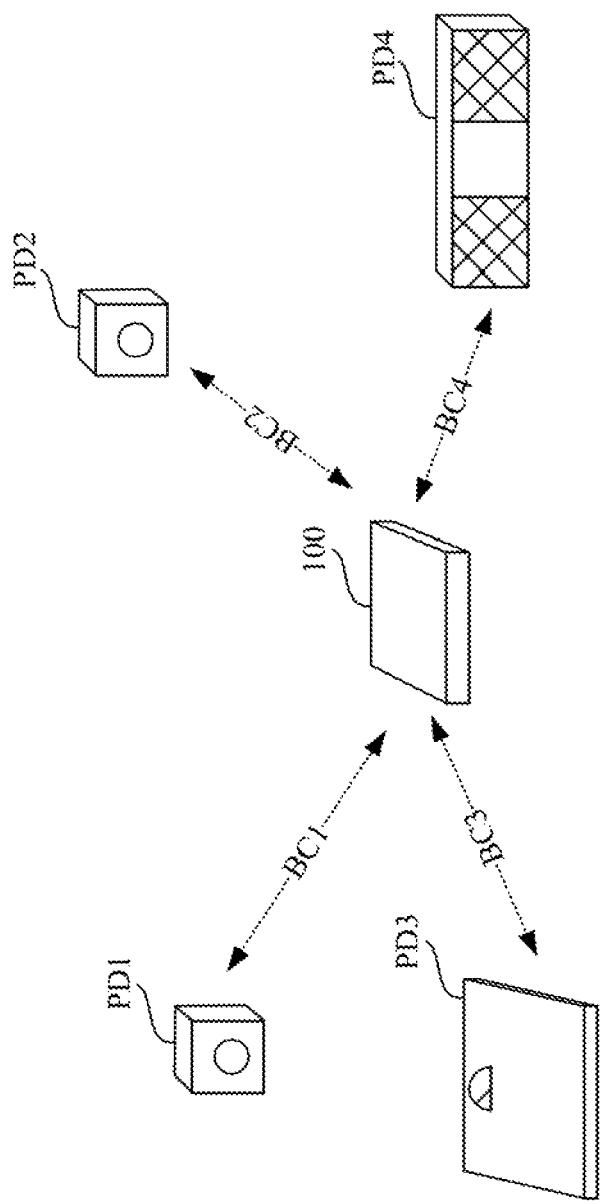
FIG. 1A is a schematic diagram illustrating a host device and some peripheral devices around the host device according to an embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

Figure 1B:
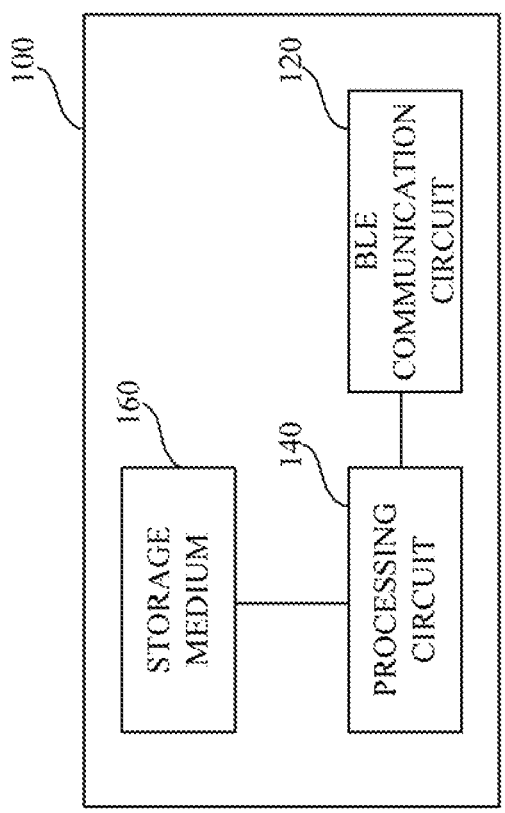
FIG. 1B is a functional block diagram illustrating the host device in FIG. 1A.

Reference is made to FIG. 1A and FIG. 1B. FIG. 1A is a schematic diagram illustrating a host device 100 and some peripheral devices PD1-PD4 around the host device 100 according to an embodiment of this disclosure. FIG. 1B is a functional block diagram illustrating the host device 100 in FIG. 1A.

In the embodiment shown in FIG. 1, there are different peripheral devices PD1-PD4 located around the host device 100. These peripheral devices PD1-PD4 may be placed at different positions and include functions. These peripheral devices PD1-PD4 are capable to be connected over a Bluetooth Low Energy (BLE) protocol. For example, the peripheral devices PD1 and PD2 as shown in FIG. 1A are base stations for a virtual reality system. The base stations with the BLE connectivity can be utilized to detect a gesture or a motion of a user, to capture a depth map of the space, or to provide some positioning signals. For example, the peripheral device PD3 as shown in FIG. 1A is a smart weight scale with the BLE connectivity. The smart weight scale is capable of measuring weight readings of a user, recording the weight readings and providing a weight historical log of the user. For example, the peripheral device PD4 as shown in FIG. 1A is a loudspeaker with BLE connectivity. The loudspeaker is capable of broadcasting an audio sound. However, the peripheral devices PD1-PD4 shown in FIG. 1A are illustrated for demonstration. The peripheral devices in this disclosure are not limited thereto. The peripheral devices can be any equivalent electronic device with BLE connectivity.

As shown in FIG. 1B, the host device 100 includes a BLE communication circuit 120, a processing circuit 140 and a storage medium 160. The BLE communication circuit 120 may include a BLE transceiver, an antenna module, a codec circuit for the BLE protocol and/or any component required to establish BLE connections (referring the BLE connections BC1-BC4 shown in FIG. 1A) from the host device 100 to the peripheral devices PD1-PD4. The processing circuit 140 is coupled to the BLE communication circuit 120 and the storage medium 160. The processing circuit 140 can be a processor, a system-on-chip (SoC) circuit, a central processing unit (CPU) and/or similar processing component. The storage medium 160 can be a flash memory, a read-only memory (ROM), a hard disk or a non-transitory computer readable media.

As shown in FIG. 1A, the host device 100 can be a wireless communication hub, a Bluetooth dongle, a set up box, a link box, a computer, a server and/or any electronic device capable of establishing the BLE connections and communicating with the peripheral devices PD1-PD4 over the BLE connections BC1-BC4. The host device 100 can exchange data with the peripheral devices PD1-PD4 around. The peripheral devices PD1-PD4 may provide some peripheral functions to the host device 100. For example, the peripheral devices PD1 and PD2 can provide positioning data of virtual reality applications to the host device 100; the peripheral device PD3 can provide the weight readings or the weight historical log to the host device 100; and the peripheral device PD4 can broadcast an audio file sent from the host device 100.

For security issues and also to save power consumption on the host device 100 and the peripheral devices PD1-PD4, the BLE connections BC1-BC4 shown in FIG. 1A are not always connected. When the host device 100 in FIG. 18B is requested to perform some tasks (e.g., a virtual reality gaming program is launched, a health-monitoring program is launched or an audio file is to be broadcasted) related to the peripheral devices PD1-PD4, the processing circuit 140 will trigger the BLE communication circuit 120 to perform a BLE connection procedure. The BLE connection procedure may include scanning for the peripheral devices PD1-PD4 around the host device 100, waking up desired devices among the peripheral devices PD1-PD4 and establishing the BLE connections to the desired devices. Details about the BLE connection procedure in this disclosure are introduced in following embodiments.

Figure 2:
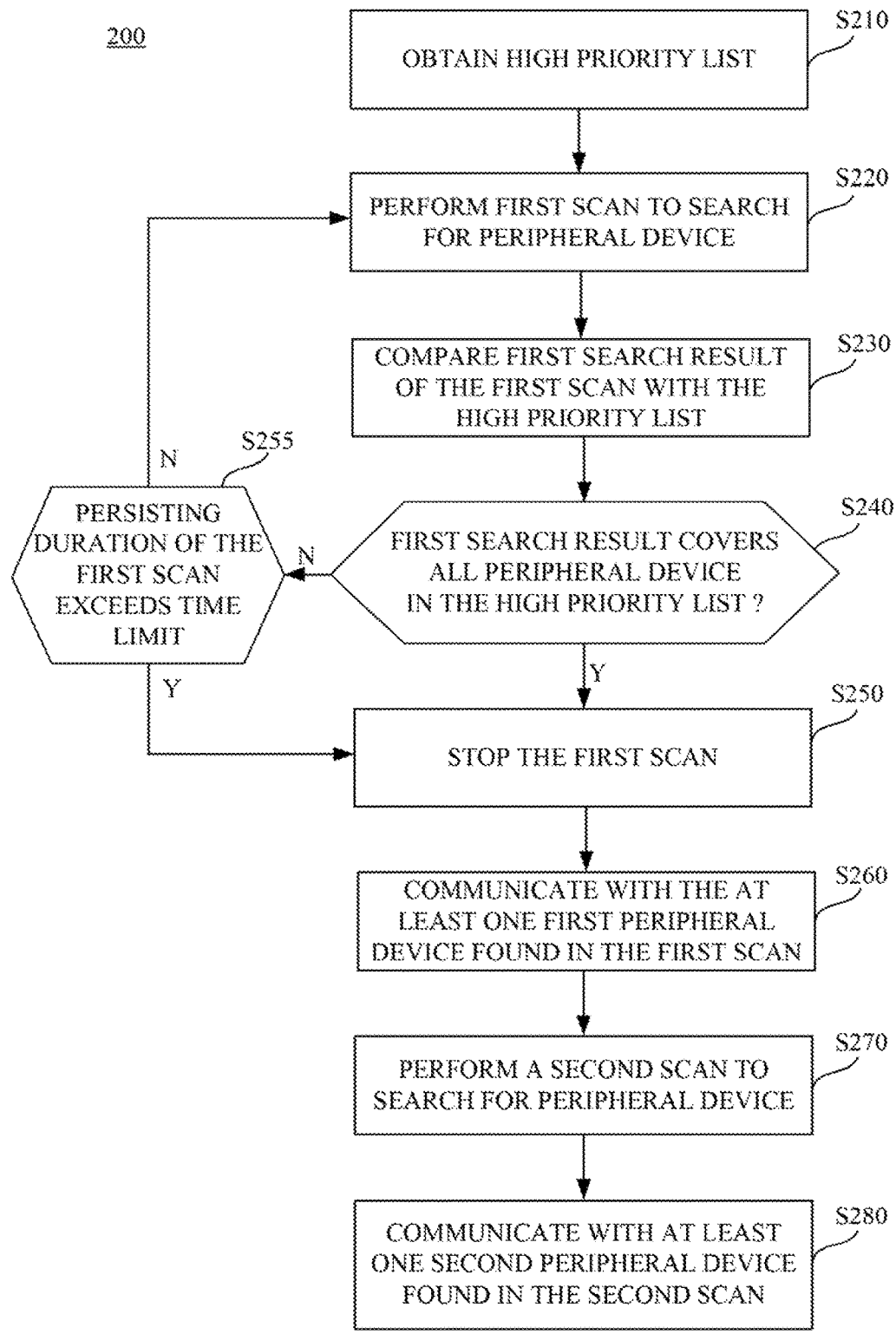
FIG. 2 is a flow chart illustrating a control method 200 according to an embodiment the disclosure.

Reference is made to FIG. 2, which is a flow chart illustrating a control method 200 according to an embodiment the disclosure. The control method 200 is suitable to be utilized by the host device 100 shown in FIG. 1A and FIG. 1B. As shown in FIG. 2, operation S210 of the control method 200 is executed to obtain a high priority list. In an embodiment, the high priority list includes information about at least one high-priority peripheral device. As shown in FIG. 1B, the high priority list can be a historical log about any peripheral device previously communicated with the host device 100, the high priority list can be stored in the storage medium 160. The processing circuit 140 can obtain the high priority list by reading the high priority list previously stored the storage medium 160.

For example, if the peripheral devices PD1 and PD2 among the peripheral devices PD1-PD4 have been connected with the host device 100 and also the peripheral devices PD1 and PD2 have been communicated with the host device 100 over the BLE connections BC1 and BC2, the information about the peripheral devices PD1 and PD2 can be recorded in the high priority list. The information about the peripheral devices PD1 in the high priority list can include a Bluetooth device address (BDA) of the peripheral devices PD1. The information about the peripheral devices PD2 in the high priority list can include another Bluetooth device address (BDA) of the peripheral devices PD2. In aforesaid example, the peripheral devices PD1 and PD2 are regarded as the high-priority peripheral devices in the high priority list.

As shown in FIG. 1B and FIG. 2, operation S220 of the control method 200 is executed by the processing circuit 140 for triggering the BLE communication circuit 120 to perform a first scan to search for any peripheral device around the host device 100. During the first scan in this embodiment, the BLE communication circuit 120 is triggered to search for the peripheral devices PD1-PD4 around the host device 100 in FIG. 1A. If the first scan is not interrupted or stopped, these peripheral devices PD1-PD4 may be found by the first scan one-by-one sequentially. In practices, a sequential order about which one of the peripheral devices PD1-PD4 is found earlier may be different from time to time, and will not be always the same. For example, the sequential order can be PD1, PD3, PD2 and then PD4 at a time, or be PD4, PD1, PD2 and then PD3 at the next time, or be PD2, PD1, PD4 and then PD3 at another time.

During the first scan, operation S230 of the control method 200 is executed by the processing circuit 140 for comparing a first search result of the first scan with the high priority list. Afterward, operation S240 of the control method 200 is executed by the processing circuit 140 for determining whether the first search result of the first scan covers all of the high-priority peripheral device(s) in the high priority list. If the first search result already covers all of the high-priority peripheral device(s) in the high priority list, operation S250 of the control method 200 is executed by the processing circuit 140 for triggering the BLE communication circuit 120 to stop the first scan. In other words, the first scan is stopped (or interrupted) immediately when the first search result covers all of the high-priority peripheral device(s) in the high priority list. For example, if the peripheral devices PD1 and PD2 are the high-priority peripheral devices in the high priority list, the first scan will be stopped immediately when the first search result includes the peripheral devices PD1 and PD2. Even though there are still other peripheral devices PD3 and PD4 on the BLE communication channel, the first scan will ignore unsearched devices.

If at least one of the high-priority peripheral devices in the high priority list is not found in the first scan, operation S255 of the control method 200 is executed by the processing circuit 140 for calculating a persisting duration of the first scan and determining whether the persisting duration exceeds a time limit (e.g., 3 seconds, 10 seconds or other given time limits). If the at least one of the high-priority peripheral devices in the high priority list is not found in the first scan and the persisting duration is not over the time limit, the control method 200 goes back to operation S220 and the BLE communication circuit 120 continues the first scan, until all high-priority peripheral devices are found in the first search result or the time limit expires.

Once the first scan is stopped (in operation S250), operation S260 of the control method 200 is executed by the processing circuit 140 for triggering the BLE communication circuit 120 to communicate with the peripheral device found in the first scan. For example, if the peripheral devices PD1 and PD2 are the high-priority peripheral devices in the high priority list and the peripheral devices PD1 and PD2 are found in the first scan, the BLE communication circuit 120 will establish the BLE connections BC1 and BC2 accordingly. In this case, the BLE connections BC1 and BC2 are formed right after the peripheral devices PD1 and PD2 are found in the first scan. Therefore, the host device 100 can establish the BLE connections BC1 and BC2 if the first search result covers all high-priority peripheral devices in the high priority list, and do not have to wait until all of the peripheral devices PD1-PD4 are scanned.

In an embodiment, operation S270 of the control method 200 is further executed by the processing circuit 140 for triggering the BLE communication circuit 120 to perform a second scan to search around the host device 100. The second scan is a standard full scan of the BLE communication circuit 120. The second scan is utilized to search all peripheral devices around the host device 100. If the peripheral devices PD1 and PD2 are the high-priority peripheral devices in the high priority list and the peripheral devices PD1 and PD2 are already communicated with the host device 100 in aforesaid operation S260, the operation S270 is utilized to find the peripheral devices PD3 and PD4 which are not in the high priority list. In this case, the peripheral devices PD3 and PD4 are regarded as low-priority devices. Operation S280 of the control method 200 is further executed by the processing circuit 140 for triggering the BLE communication circuit 120 to communicate with the low-priority peripheral devices according to the second search result of the second scan.

In the example that the peripheral devices PD1 and PD2 are the high-priority peripheral devices in the high priority list, the host device 100 can establish the BLE connections BC1 and BC2 relatively faster without the burden to search for all peripheral devices on the BLE channel.

Figure 3:
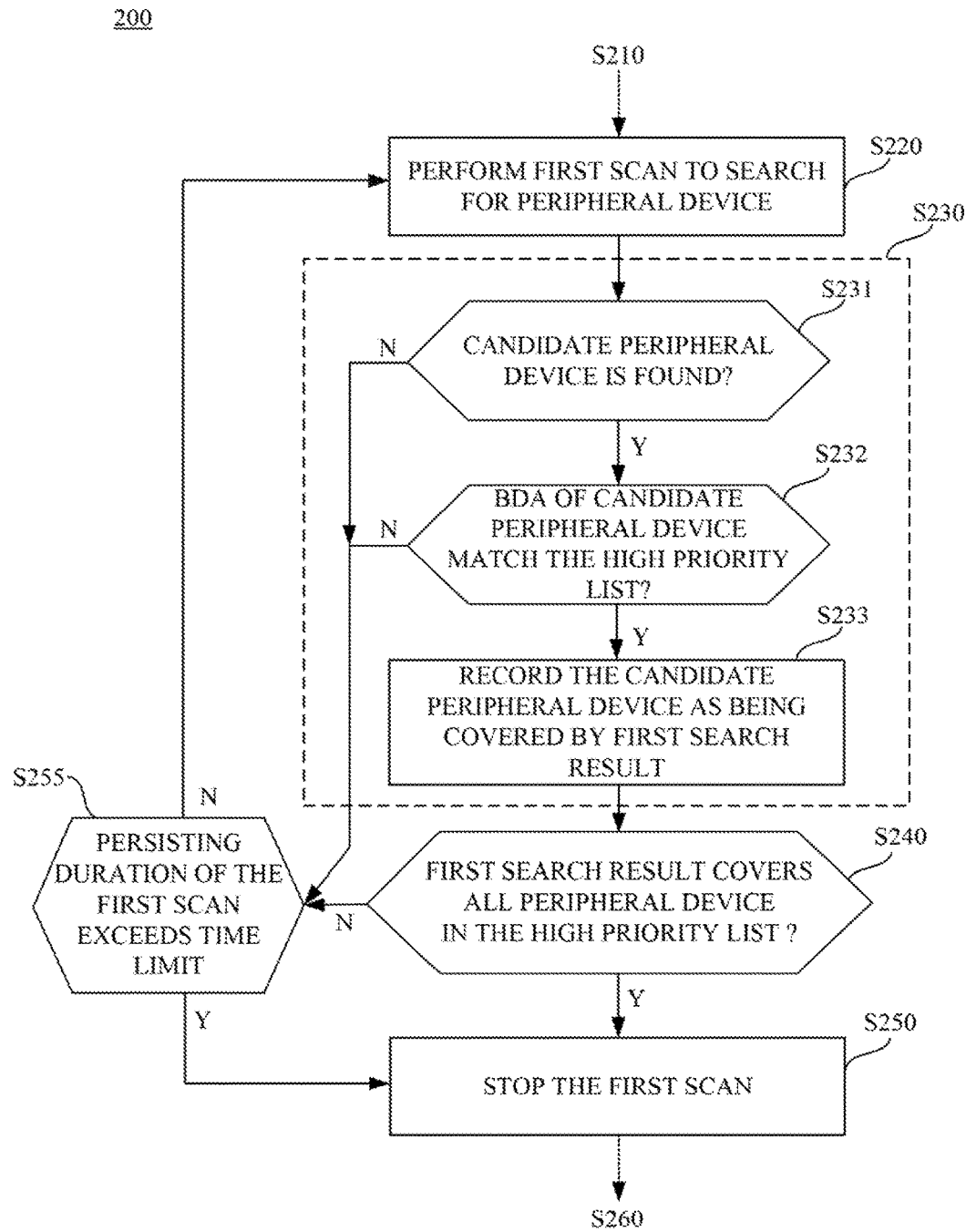
FIG. 3 is a flow chart illustrating further details of the operation in FIG. 2 according to an embodiment the disclosure.

Reference is further made to FIG. 3, which is a flow chart illustrating further details of the operation S230 in FIG. 2 according to an embodiment the disclosure. As shown in FIG. 3, the operation S230 in FIG. 2 may include further operations S231-S233.

Referring to FIG. 3, the high priority list includes a first Bluetooth device address of each high-priority peripheral device. The BLE communication circuit 120 is configured to obtain a second Bluetooth device address of a candidate peripheral device around the host device during the first scan (S220). Within the operation S230, the operation S231 is executed for determining whether a candidate peripheral device is found around the host device 100. If the candidate peripheral device is found, the BLE communication circuit 120 is configured to obtain a second Bluetooth device address of the candidate peripheral device around the host device during the first scan (S220). The operation S232 is executed for determining whether the second Bluetooth device address of the candidate peripheral device matches the first Bluetooth device addresses of the high-priority devices in the high priority list. If the second Bluetooth device address matches any one of the first Bluetooth device addresses in the high priority list, operation S233 is executed for recording the candidate peripheral device with the matched one of the at least one first Bluetooth device address as being covered by the first search result.

It is assumed that the peripheral devices PD1 and PD2 are the high-priority peripheral devices in the high priority list. If the peripheral device PD3 is firstly scanned as the candidate peripheral device. A Bluetooth device address of the peripheral device PD3 will not have a match in the high priority list. The control method 200 will return to operation S220 (if the persisting duration of the first scan does not exceed time limit) and the first scan continues. If the peripheral device PD2 is then scanned as the candidate peripheral device, a Bluetooth device address of the peripheral device PD2 will have a match in the high priority list. The control method 200 will go to operation S233 to record the current candidate peripheral device (i.e., the peripheral device PD2) as being covered in the first search result. Afterward, in operation S240, because the first search result only covers the peripheral device PD2 and does not cover all peripheral devices (PD1 and PD2 in this example) in the high priority list, the control method 200 return to operation S220 (if the persisting duration of the first scan does not exceed time limit) again. If the peripheral device PD1 is then scanned as the candidate peripheral device, a Bluetooth device address of the peripheral device PD1 will have a match in the high priority list. The control method 200 will go to operation S233 to record the current candidate peripheral device (i.e., the peripheral device PD1) as being covered in the first search result. Afterward, in operation S240, because the first search result covers all of the peripheral devices (PD1 and PD2 in this example) in the high priority list, the control method 200 proceeds to the operation S250. In aforesaid example, the peripheral devices PD1-PD4 around the host device 100 as shown in FIG. 1A can be scanned one-by-one in the operations S231-S233 at a time.

Figure 4:
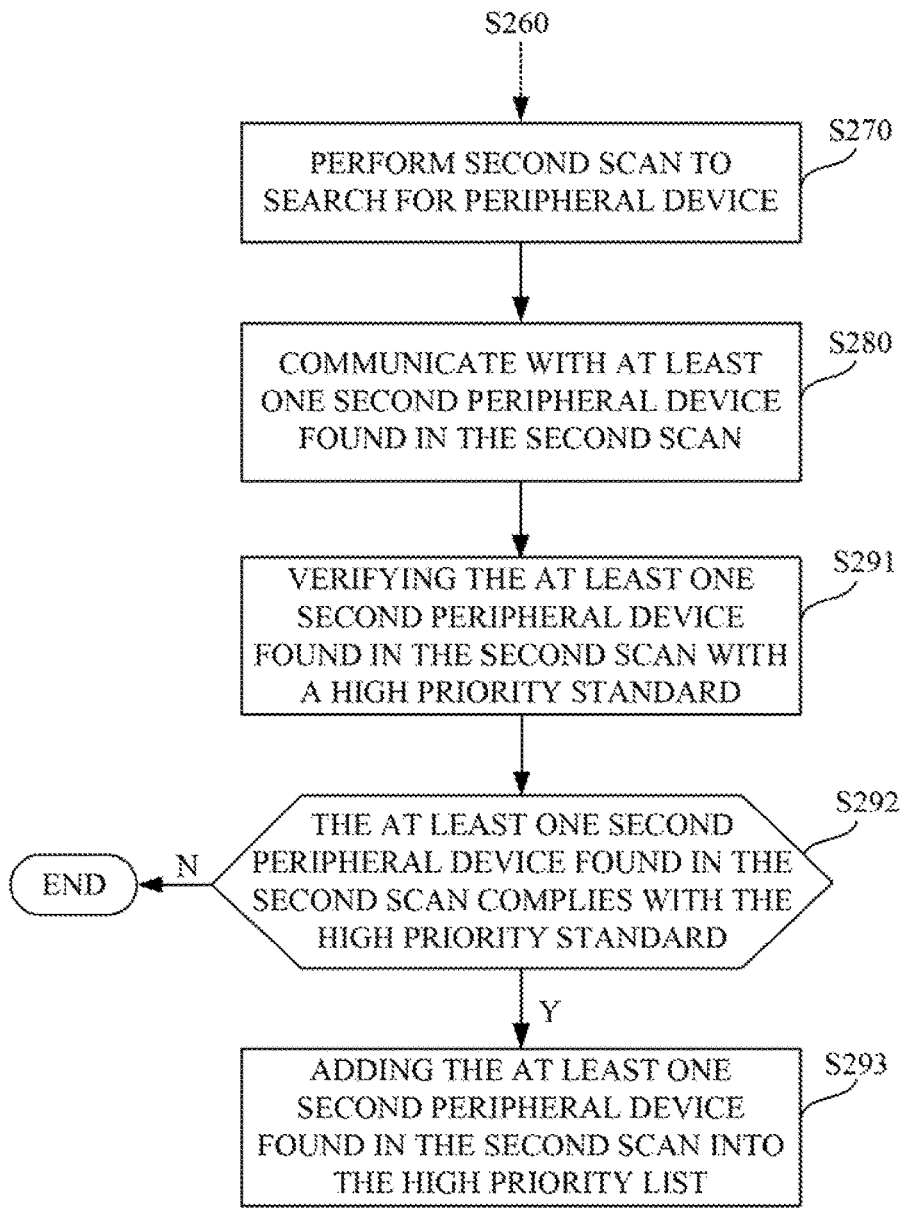
FIG. 4 is a flow chart illustrating additional operations of the control method shown in FIG. 2 according to another embodiment the disclosure.

In aforesaid example, items in the high priority list are assumed to include the peripheral devices PD1 and PD2 for demonstration. However, this disclosure is not limited thereto. In another embodiment, the items in the high priority list are not fixed and are adjustable. Reference is further made to FIG. 4, which is a flow chart illustrating additional operations S291-S293 of the control method 200 shown in FIG. 2 according to another embodiment the disclosure.

In the embodiment shown in FIG. 4, the method 200 further includes additional operations S291-S293 after the operation S280 discussed in aforesaid embodiment shown in FIG. 2. After the BLE communication circuit 120 perform the second scan (e.g., the standard full scan), some peripheral devices not existed in the high priority list will be identified. It is assumed that the peripheral devices PD1 and PD2 are the original high-priority peripheral devices in the high priority list. The peripheral devices PD3 and PD4 will be identified in the second scan. Operation S291 is executed by the processing circuit 140 for verifying the peripheral device found in the second scan with a high priority standard. In an embodiment, the peripheral device found in the second scan can be verified by the Bluetooth device address or a Bluetooth device name. The Bluetooth device name includes a string indicating some features of the peripheral device. The Bluetooth device name may suggest or hint a manufacture, a brand, a product name and/or a function of the peripheral device found in the second scan. Operation S292 is executed by the processing circuit 140 for determining whether the peripheral device found in the second scan complies with the high priority standard. If the peripheral device found in the second scan complies with the high priority standard, operation S293 is executed by the processing circuit 140 for adding the peripheral device found in the second scan into the high priority list, and the updated high priority list can be stored into the storage medium 160 in FIG. 1B. The updated high priority list can be utilized by the processing circuit 140 in the future BLE communication procedure.

In an example, the high priority standard may include that the peripheral devices has a specific function. In this case, the Bluetooth device name is required to include a string such as "HealthBox". In this case, a Bluetooth device name of the smart weight scale may include the string "Health-Box", such that the peripheral device PD3 in FIG. 1A can be added to the high priority list in the operation S293.

In another example, the high priority standard may include that the peripheral devices is produced by a specific brand. In this case, the Bluetooth device name is required to include a string such as "HTC" or "VIVE". In this case, if the peripheral devices PD1 and PD2 is replaced by a new one. The new base station (not shown in figures) may include the string "HTC" or "VIVE", such that the new base station can be added to the high priority list in the operation S293.

In still another example, the high priority standard may include that the peripheral devices has the Bluetooth device address in a certain range.

Therefore, the high priority standard can be adjusted dynamically according to the second search result of the second scan.

Figure 5:
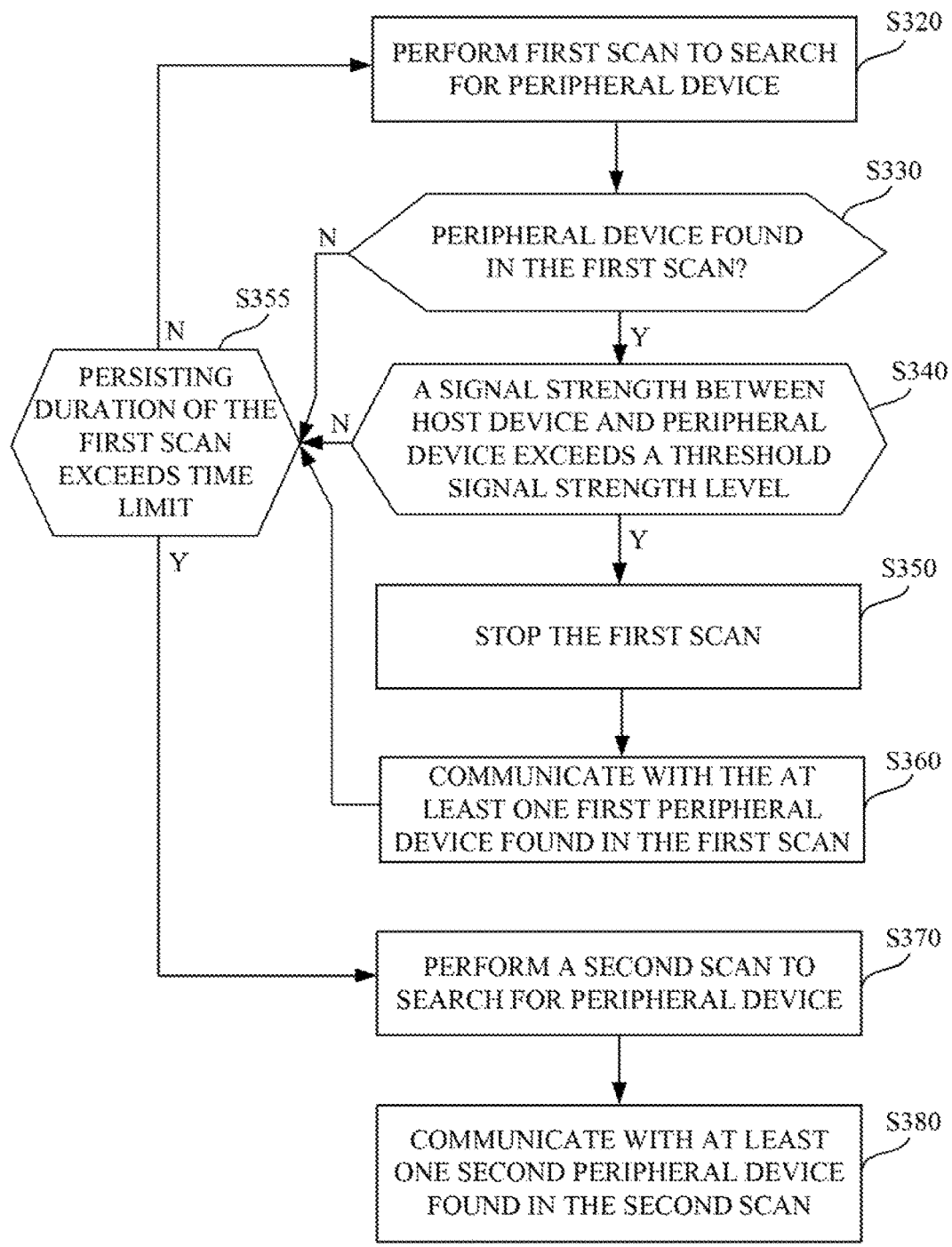
FIG. 5 is a flow chart illustrating a control method according to another embodiment of the disclosure.

Reference is further made to FIG. 5, which is a flow chart illustrating a control method 300 according to another embodiment of the disclosure. The control method 300 is also suitable to be utilized on the host device 100 shown in FIG. 1A and FIG. 1B. Compared to the control method 200 in FIG. 2, FIG. 3 and FIG. 4, the control method 300 in FIG. 5 does not rely on the high priority list as a standard to stop the first scan.

In the embodiment shown in FIG. 1A, FIG. 1B and FIG. 5, operation S320 is executed by the processing circuit 140 for triggering the BLE communication circuit 120 to perform a first scan to search around the host device 100. Operation S330 is executed by the processing circuit 140 for determining whether a peripheral device is found in the first scan. If one peripheral device (PD1, PD2, PD3 or PD4 in FIG. 1A) is found in this round of the first scan, the BLE communication circuit 120 measures a signal strength between the host device 100 and the peripheral device found in the first scan.

Operation S340 is executed by the processing circuit 140 for comparing the signal strength between the host device 100 and the peripheral device found in the first scan with a threshold signal strength level (e.g., the threshold signal strength can be configured as 20 dB). If the signal strength between the host device 100 and the peripheral device found in the first scan exceeds the threshold signal strength level, operation S350 is executed by the processing circuit 140 for triggering the BLE communication circuit 120 to stop the first scan.

When the first scan is temporally stopped, operation S360 is executed by the processing circuit 140 for triggering the BLE communication circuit 120 to communicate with the peripheral device found in the first scan. In this case, the host device 100 is able to establish the BLE connection to the peripheral devices with relative strong signal strength levels. In this case, these peripheral devices with relative strong signal strength levels may indicates these peripheral devices are located closer to the host device 100, and are regarded as having relatively higher priority.

If no peripheral device is found in this round of the first scan (S330), or if the signal strength between the host device 100 and the peripheral device found in the first scan is lower than the threshold signal strength level (S340), operation S355 is executed by the processing circuit 140 for calculating the persisting duration of the first scan and determining whether the persisting duration exceed a time limit (e.g., 2 seconds, 10 seconds, or other given time limit for the first scan). When the persisting duration of the first scan is still within the time limit, the control method 300 proceeds to the operation S320 to continue the first scan, which will go on to search for the peripheral device with a higher signal strength.

After the operation S360 is executed by the processing circuit 140 for triggering the BLE communication circuit 120 to communicate with the peripheral device found in the first scan, the control method 300 also proceeds to the operation S355. When the total persisting duration of the first scan exceeds the time limit, the control method 300 proceeds to operation S370 for triggering the BLE communication circuit 120 to perform a second scan to search around the host device 100. Afterward, the control method 300 proceeds to operation S380 for triggering the BLE communication circuit 120 to communicate with at least one second peripheral device according to a second search result of the second scan. The second scan is a standard full scan performed by the BLE communication circuit 120. During the second scan, all peripheral devices will be searched regardless of the signal strength between the host device 100 and the target peripheral devices. The host device 100 will connect to and communicate with the peripheral devices with relative lower signal strength toward the host device 100 in the operation S380.

Figure 6:
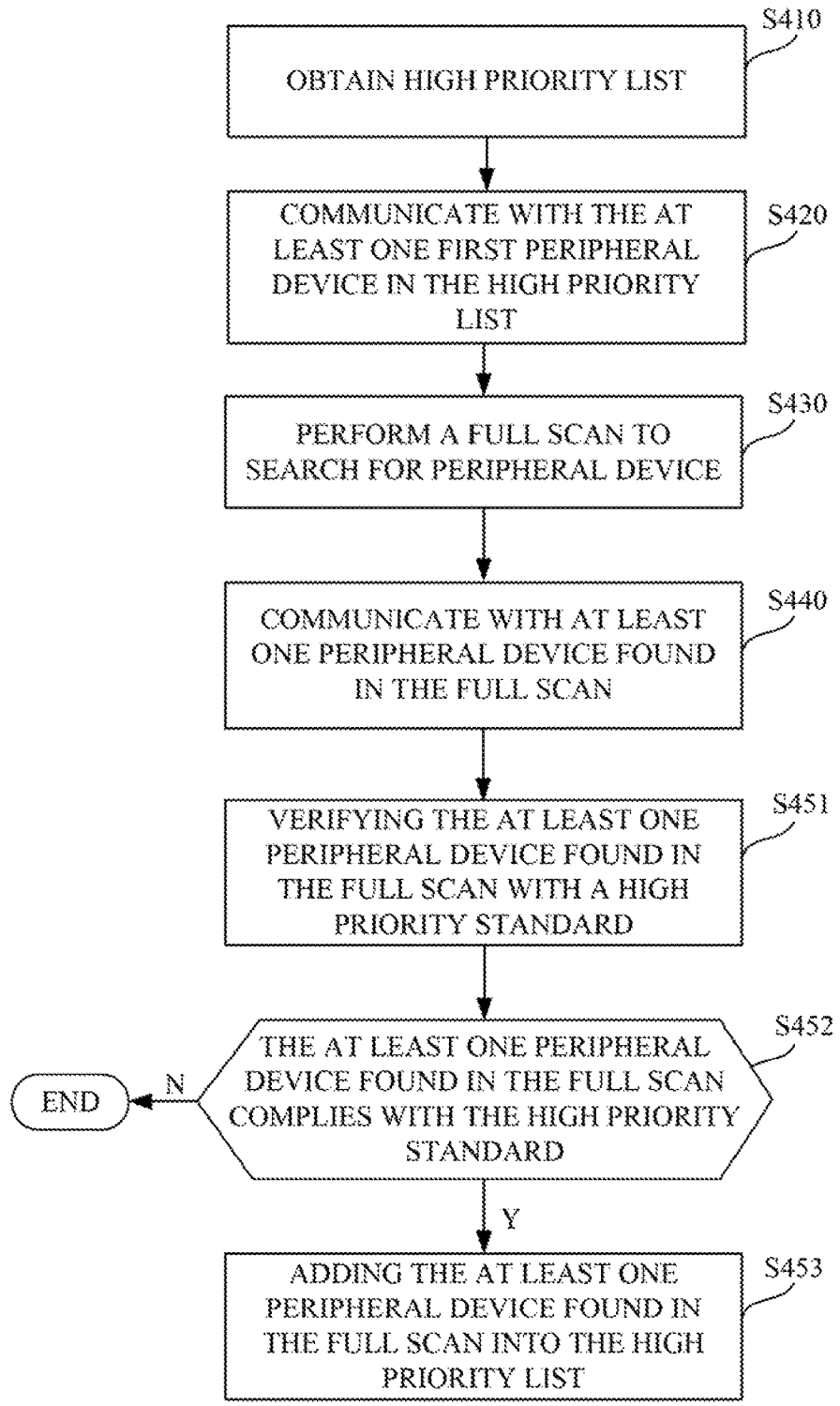
FIG. 6 is a flow chart illustrating a control method according to still another embodiment of the disclosure.

Reference is further made to FIG. 6, which is a flow chart illustrating a control method 400 according to still another embodiment of the disclosure. The control method 400 is also suitable to be utilized on the host device 100 shown in FIG. 1A and FIG. 1B. Compared to the control method 200 in FIG. 2, FIG. 3 and FIG. 4, the control method 400 in FIG. 6 does not include operations of the first scan in aforesaid embodiments.

In the embodiment shown in FIG. 1A, FIG. 1B and FIG. 6, operation S410 is executed by the processing circuit 140 for obtaining a high priority list. In an embodiment, the high priority list includes information about at least one high-priority peripheral device. As shown in FIG. 1B, the high priority list can be a historical log about any peripheral device previously communicated with the host device 100, the high priority list can be stored in the storage medium 160. The processing circuit 140 can obtain the high priority list by reading the high priority list previously stored the storage medium 160.

For example, if the peripheral devices PD1 and PD2 in FIG. 1A among the peripheral devices PD1-PD4 have been connected with the host device 100 and also the peripheral devices PD1 and PD2 have been previously communicated with the host device 100 over the BLE connections BC1 and BC2, the information about the peripheral devices PD1 and PD2 can be recorded in the high priority list. The information about the peripheral devices PD1 in the high priority list can include a Bluetooth device address (BDA) of the peripheral devices PD1. The information about the peripheral devices PD2 in the high priority list can include another Bluetooth device address (BDA) of the peripheral devices PD2. In aforesaid example, the peripheral devices PD1 and PD2 are regarded as the high-priority peripheral devices in the high priority list.

Operation S420 is executed by the processing circuit 140 for triggering the BLE communication circuit 120 to communicate with the peripheral device (e.g., the peripheral devices PD1 and PD2) in the high priority list. Because the peripheral devices PD1 and PD2 have been previously connected with the host device 100, and the high priority list records the Bluetooth device addresses of the peripheral devices PD1 and PD2. The BLE communication circuit 120 is able to form the BLE connections BC1 and BC2 and communicate with the peripheral devices PD1 and PD2 in the high priority list directly, before performing a full scan by the BLE communication circuit 120. Therefore, the BLE connections BC1 and BC2 can be established immediately after the high priority list is read by processing circuit 120 from the storage medium 160. No scan is required before the operation S420.

Afterward, operation S430 is executed by the processing circuit 140 for triggering the BLE communication circuit 120 to perform a full scan to search for the peripheral device(s) around the host device 100. If there is any peripheral device detected in the full scan and not recorded in the high priority list (e.g., the peripheral devices PD3 and PD4 are not recorded in the high priority list), operation S440 is executed by the processing circuit 140 for triggering the BLE communication circuit 120 to communicate with at least one peripheral device according to a search result of the full scan. The peripheral device in the search result of the full scan is also regarded as a low-priority peripheral device.

In addition, the control method 400 in an embodiment may further include operations S451, S452 and S453 to update the high priority list.

After the BLE communication circuit 120 perform the full scan (e.g., the standard full scan), some peripheral devices not existed in the high priority list will be identified in the full scan. It is assumed that the peripheral devices PD1 and PD2 are the original high-priority peripheral devices in the high priority list. The peripheral devices PD3 and PD4 will be identified in the full scan. Operation S451 is executed by the processing circuit 140 for verifying the peripheral device found in the full scan with a high priority standard. In an embodiment, the peripheral device found in the full scan can be verified by the Bluetooth device address or a Bluetooth device name. The Bluetooth device name includes a string indicating some features of the peripheral device. The Bluetooth device name may suggest or hint a manufacture, a brand, a product name and/or a function of the peripheral device found in the full scan. Operation S452 is executed by the processing circuit 140 for determining whether the peripheral device found in the full scan complies with the high priority standard. If the peripheral device found in the full scan complies with the high priority standard, operation S453 is executed by the processing circuit 140 for adding the peripheral device found in the full scan into the high priority list, and the updated high priority list can be stored into the storage medium 160 in FIG. 1B. The updated high priority list can be utilized by the processing circuit 140 in the future BLE communication procedure.

Further details about the operations S451, S452 and S453 can be referred to embodiments about the operation S291, S292 and S293, and not to be repeated herein.

Based on control method 400 shown in FIG. 6, the host device 100 in FIG. 1 is able to establish the BLE connection to the peripheral device existed in the high priority list already before performing any scanning. Therefore, when the user tries to connect the host device 100 to a high-priority peripheral device, the user do not have to endure a long response time. The BLE communication circuit 120 will firstly establish the BLE connection to the peripheral device existed in the high priority list, and preform the full scan afterward.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, suitable for a host device comprising a Bluetooth low energy (BLE) communication circuit and a processing circuit, the control method comprising:
    obtaining a high priority list by the processing circuit, the high priority list comprising information about a plurality of first peripheral devices;
    triggering, by the processing circuit, the BLE communication circuit to perform a first scan to search for any peripheral device around the host device;
    comparing, by the processing circuit, a first search result of the first scan with the high priority list;
    in response to that the first search result covers all of the first peripheral devices in the high priority list, triggering, by the processing circuit, the BLE communication circuit to stop the first scan; and
    triggering, by the processing circuit, the BLE communication circuit to communicate with the first peripheral devices found in the first scan.

2. The control method of claim 1, wherein after triggering the BLE communication circuit to communicate with the first peripheral devices found in the first scan, the control method further comprises:
    triggering the BLE communication circuit to perform a second scan to search around the host device; and
    triggering the BLE communication circuit to communicate with at least one second peripheral device according to a second search result of the second scan.

3. The control method of claim 2, wherein the control method further comprises:
    verifying the at least one second peripheral device found in the second scan with a high priority standard; and
    in response to that the at least one second peripheral device found in the second scan complies with the high priority standard, adding the at least one second peripheral device found in the second scan into the high priority list.

4. The control method of claim 1, wherein the control method further comprises:
    calculating a persisting duration of the first scan; and
    in response to that the persisting duration of the first scan exceeds a time limit, triggering the BLE communication circuit to stop the first scan.

5. The control method of claim 1, wherein the first scan is stopped immediately when the first search result covers all of the first peripheral devices in the high priority list.

6. The control method of claim 1, wherein the high priority list comprises a plurality of first Bluetooth device addresses of the first peripheral devices, the BLE communication circuit is configured to obtain a second Bluetooth device address of a candidate peripheral device around the host device during the first scan, in the operation of comparing the first search result of the first scan with the high priority list, the control method comprises:
    determining whether the second Bluetooth device address matches one of the first Bluetooth device addresses; and
    if the second Bluetooth device address matches one of the first Bluetooth device addresses, recording the candidate peripheral device with the matched one of the first Bluetooth device addresses as being covered by the first search result.

7. The control method of claim 1, wherein the high priority list is established according to a historical log about any peripheral device previously communicated with the host device.

* * * * *